Figure 1:
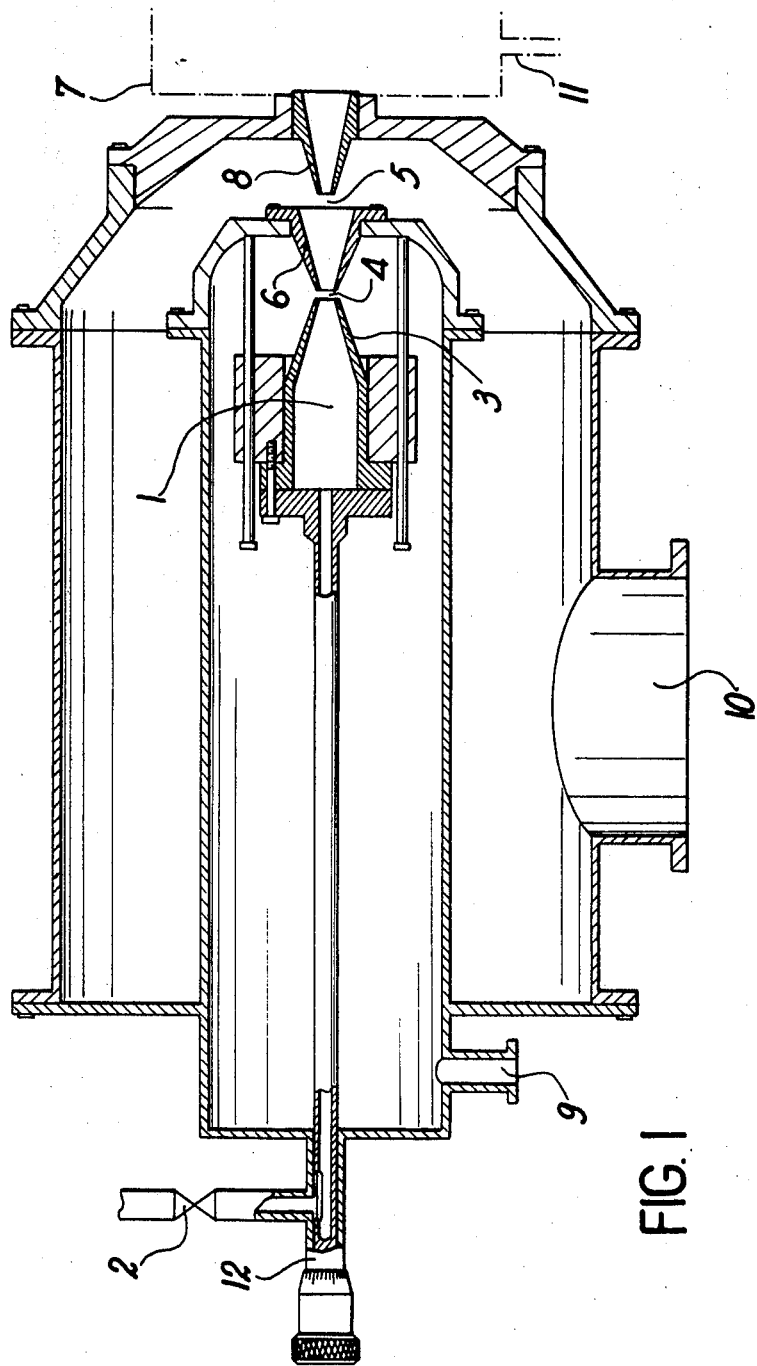

United States Patent

[11] 3,583,633

| | | |
|---|---|---|
| [72] | Inventor | Roger Campargue<br>Paris, France |
| [21] | Appl. No. | 822,159 |
| [22] | Filed | May 6, 1969 |
| [45] | Patented | June 8, 1971 |
| [73] | Assignee | Commissariat A L'Energie Atomique<br>Paris, France |
| [32] | Priority | May 14, 1968 |
| [33] | | France |
| [31] | | 151768 |

[54] METHODS AND DEVICES FOR PRODUCING JETS BY FREE EXPANSION OF A GAS
10 Claims, 2 Drawing Figs.

| | | |
|---|---|---|
| [52] | U.S. Cl. | 239/102 |
| [51] | Int. Cl. | B05b 3/14 |
| [50] | Field of Search | 239/1, 102 |

[56] References Cited
UNITED STATES PATENTS

| | | | |
|---|---|---|---|
| 2,532,554 | 12/1950 | Joeck | 239/1UX |
| 3,371,869 | 3/1968 | Hughes | 239/102 |

FOREIGN PATENTS

| | | | |
|---|---|---|---|
| 945,692 | 1/1964 | Great Britain | 239/102 |
| 1,360,332 | 3/1964 | France | 239/102 |

*Primary Examiner*—M. Henson Wood, Jr.
*Assistant Examiner*—Michael Y. Mar
*Attorney*—Cameron, Kerkam and Sutton ABSTRACT: A method and device for producing jets or beams of particles by expansion of a gas through an orifice having a small cross-sectional area from a first chamber in which is maintained a pressure $P_o$ into a second chamber in which is maintained a pressure $P_1$. The method essentially consists both in maintaining the pressure $P_1$ equal to a value between $10^{12}$ and 10 torr and in selecting the distance $b$ between the expansion orifice and the inlet of a divertor as a function of the diameter $D_o$ of said orifice in order that the intensity of the jet which is produced should be of maximum value and particularly in selecting a sufficiently high value of pressure $P_o$ to ensure that the optimum value of the ratio $b/D_o$ as defined above is higher than 100:1.

METHODS AND DEVICES FOR PRODUCING JETS BY FREE EXPANSION OF A GAS

The invention relates to methods and devices for producing jets or beams of particles by free expansion of a gas through an orifice having a small cross-sectional area from a first chamber in which is maintained a pressure $P_0$ into a second chamber in which is maintained a pressure $P_1$, the axial portion of the expanded jet being subsequently collected by means of a so-called divertor or diaphragm which is preferably of frustoconical shape and divergent so that there is thus preferably formed a jet which is discharged in a molecular flow regime, that is to say without collisions.

It is of interest to note that jets which are formed by free expansion have a wide range of potential applications, in particular in the field of separation of constituents of a gaseous mixture or in the formation of molecular flow jets. The particular advantages which are provided by jets of the latter type (elimination of wall effects, elimination of collisions between the molecules of the jet, accurate localization of the impact of a jet of this type on a target, and so forth) make them highly useful in a number of studies such as the following: analysis of gases, the study of the structure of molecules, of ions, of radicals (for example by production of hyperfine-structure optical spectra which are not affected by the Doppler effect); the study of elastic and inelastic collisions (excitation, ionization, dissociation, chemical reaction and so forth); formation of ion sources, proton sources, plasmas; the study of interactions between gases and surfaces (condensation, evaporation, diffusion, space research and the like).

The production of jets of this type is carried out by free expansion of a gas or gaseous mixture through an orifice having a small cross-sectional area formed in a thin wall or forming the exit of a convergent nozzle from a first chamber in which is maintained a pressure $P_0$ into a second chamber in which is maintained a pressure $P_1$, the axial portion of the jet which is thus expanded being then collected in a third chamber by means of a divertor or divergent frustoconical diaphragm.

Jets of this type have already been obtained with a relatively high intensity and by means of relatively moderate pump deliveries within the second chamber by applying the teachings of French Pat. No. 1,360,332 as filed in the name of the present Applicant on Mar. 28th, 1963 and granted on Mar. 31st, 1964.

In the patent cited, it was proposed in particular to adopt an apparatus which comprises, in series with the third chamber in which an intermediate vacuum is maintained by pumping, a fourth chamber in which the molecular jet is actually produced, said fourth chamber being maintained at a relatively low pressure and supplied through a second divertor which is coaxial with the first and collects the axial portion of the jet which flows through the third chamber.

By means of this apparatus, a relatively high value can be given to the pressure $P_1$, namely a value higher than $10^{12}$ torr (1 torr being equal to 1 mm. of mercury under normal conditions, that is to say 133 Pascals), in contradistinction to earlier practice in which said pressure $P_1$ was necessarily much smaller in value, in particular of the order of $10^{14}$ torr. Such an increase in the pressure $P_1$ has a very appreciable advantage in that it considerably reduces the volumetric pumping rate which is necessary within the second chamber for a given get intensity.

However, up to the present time, the pressure $P_0$ expressed in values of torr. had remained of the order of a few tens or at the most a few hundreds at room temperature: no experiments had hitherto been attempted in the range of values above $P_0$ by reason of the attendant danger of condensation of the gases and above all on account of the difficulty involved in achieving high pumping rates, as this difficulty appeared to lead to constructions which afford only low economic performance in respect of high values of the expansion ratio $P_0/P_1$.

The method according to the present invention mainly consist both in maintaining the pressure $P_1$ equal to a value comprised between $10^{12}$ and 10 torr and in selecting the distance $b$ between the expansion orifice and the divertor inlet as a function of the diameter $D_0$ of said orifice in order that the intensity of the jet thus produced should be of maximum value and particularly in selecting a sufficiently high value of pressure $P_0$ to ensure that the optimum value of the ratio $b/D_0$ as defined above is higher than 100:1. The high value of the pressure $P_0$ is determined in the case in which the jet is constituted by a pure noncondensed gas by the relation:

$$\left(\frac{b}{D_0}\right)_{opt} = k\left(\frac{1}{Kn_0} \cdot \frac{P_0}{P_1}\right)^{1/3}$$

wherein $Kn_0$ designates the Knudsen number of the gas within the first chamber prior to expansion and $k$ designates a constant of the order of 0.125 in the case of a gas having a ratio between specific heat values at constant pressure and at constant volume which is equal to 1.4, said constant being intended to increase with said ratio.

A large number of studies pursued by the present Applicant have led to the conclusion that, in the case of a jet of pure noncondensed gas and a value of the pressure $P_1$ comprised between $10^{12}$ and 10 torr, the maximum intensity of the jet was obtained when the following relation is satisfied:

$$\frac{b}{D_0} = k\left(\frac{1}{Kn_0} \cdot \frac{P_0}{P_1}\right)^{1/3} \quad (1)$$

In this relation:

$b$ designates the axial distance between the expansion orifice and the inlet of the first divertor, $D_0$ designates the diameter of the expansion orifice, $Kn_0$ designates the Knudsen number of the gas within the first chamber prior to expansion of the gas, that is to say at the pressure $P_0$, and $k$ is a constant which is of the order of 0.125 in the case of gases having linear molecules (such as $N_2$, $O_2$, $CO$, $CO_2$, $N_2O$) for which the ratio $\gamma$ between the specific heat values at constant pressure and at constant volume of the gas is equal to 1.4; this constant $k$ varies in the same direction as the ratio $\gamma$: thus, in the case of gases for which $\gamma$ is equal to 1.67 (rare gases; $H_2$ and $D_2$ under certain conditions), the constant $k$ is of the order of 0.15.

A study of the wholly novel relation (1) given above leads to a surprising conclusion in that, all other things being equal, the intensity of the jet obtained is correspondingly greater as the ratio $P_0^2/P_1$ is higher.

It is in fact known that the Knudsen number $Kn_0$ is equal to the ratio $\lambda_0/D_0$, wherein $\lambda_0$ designates the mean free path of the gas molecules within the first chamber in which the pressure $P_0$ prevails.

In fact, this parameter $\lambda_0$ which takes into account the nature of gas is proportional to the quantity $\eta_0/P_0\sqrt{T_0/M}$, wherein $\eta_0$, $T_0$ and $M$ designate respectively the viscosity, the absolute temperature and the molecular mass of the gas within the first chamber.

The expression $1/Kn_0 \cdot P_0/P_1$ which appears in the right-hand member of relation (1) is therefore proportional to $P_0^2 D_0/P_1 \eta_0 \sqrt{M/T_0}$ and this right-hand member varies in the same direction as $P_0^2/P_1$.

In point of fact, it is known on the one hand that the theoretical intensity of a molecular jet is proportional to the square of the Mach number at the entrance of the divertor and on the other hand that the ratio $b/D_0$ is an increasing function of said Mach number, this being tantamount to the statement that said ratio varies in the same direction as the intensity of the jet.

Since the ratio referred-to constitutes the left side of relation (1), it can in fact be concluded that the intensity of the jet varies in the same direction as $P_0^2/P_1$.

It will immediately be deduced from the foregoing not only that an increase in the expansion ratio $P_0/P_1$ is conducive to an increase in the intensity of the jet—as is well known—but also and above all that the modification of $P_0$ has a greater influence on said increase in intensity than a corresponding reverse modification of $P_1$ and similarly that, in the case of a given value of the expansion ratio (which governs as a first approximation the pump delivery within the second chamber), it is particularly advantageous to give the highest possible value to each of the two terms of this ratio: in fact, a multiplication of each of the two pressures $P_0$ and $P_1$ by the same coefficient 100 gives to the ratio $P_0^2/P_1$ a value which is 100 times higher.

It is this unexpected finding which has led the present Applicant to conduct experiments with the relatively high values of $P_0$ which finally result in the production of exceptionally intense jets with wholly reasonable pump deliveries.

In accordance with the invention, these high values of $P_0$ are such that the optimum value of the ratio $b/D_0$ as defined above is higher than 100 and that, so far as pure noncondensed gases are concerned, said value satisfies the relation (1) given above, the value which is selected for the pressure $P_1$ being always higher than $10^{12}$ torr.

It should be mentioned by way of comparison that, in known experiments which have been carried out up to the present time with the values of $P_1$ which have been indicated, the value of said optimum quantity $b/D_0$ has always been lower than 60:1.

It is worthy of note that the increase in the value $P_0$ which is adopted in accordance with the invention in order to increase the expansion ratio $P_0/P_1$ and consequently the intensity of the jet has an advantage over a reduction of $P_1$ in that it results in higher efficiency by eliminating the disturbances in the expansion which arise from the phenomenon of "freezing" of the degrees of freedom of the molecules. In fact, if the pressure $P_1$ is very low as a result of a relatively low value of $P_0$, the density of the gas and consequently the frequency of the collisions of the gas molecules decrease too rapidly at the time of expansion to permit the thermodynamic equilibrium to remain over a long period between the different degrees of freedom of said molecules. It is observed that there consequently takes place in a very short time the freezing of the degrees of freedom of vibrational and rotational motion should these latter exist followed by freezing of the degrees of freedom of translational motion, which corresponds to a changeover to the molecular flow regime. This regime is therefore established within the jet long before this latter has reached the optimum distance $b$ which is given by the above relation (1), thereby resulting in a corresponding reduction in the Mach number and in the intensity of the jet which is produced.

Relation (1) has been established in the case of pure noncondensed gases but would also be valid as a first approximation in the case of gaseous mixtures and especially in the case of mixtures which result in the formation of "doped" jets and consist of a relatively heavy gas diluted in a light gas in a proportion of a few units per hundred or even less.

The condition of noncondensation is usually satisfied in the case of each gas as long as the product $P_0 D_0$ remains lower than a characteristic threshold of each gas.

Said threshold at ordinary temperature and expressed in torr mm. is, for example, equal to 60 in the case of carbon dioxide gas, to 85 in the case of argon and to 500 in the case of nitrogen.

It may prove useful to point out that, in relation (1) given above, the first member $b/D_0$ should be written more exactly $(b-x_0)/D_0$, wherein $x_0$ is the axial distance between the orifice of the nozzle and the "source" point from which the flow lines of the expanded jet appear to radiate. The value $x_0/D_0$ is known in the case of the principal values of $\gamma$ (this value being equal, for example, to 0.40 in the case of a value of $\gamma$ of 1.40 and to 0.075 in the case of a $\gamma$ value of 1.67). However, since said value $x_0/D_0$ is always smaller than 1, its influence on the accuracy of the relation (1) is less than 1 percent, that is to say lower than the degree of accuracy with which the constant $k$ is known, and it is for this reason that said value has purposely been disregarded in the foregoing description.

The present invention is also directed to a device for producing jets or beams of particles and comprising means for feeding a gas at a pressure $P_0$ into a convergent nozzle which opens into a chamber maintained at a pressure $P_1$ below $P_0$ and which is provided with a discharge opening of divergent shape or so-called divertor which is located in the centerline of said nozzle, characterized in that the distance $b$ between the orifice of said nozzle and the inlet of the divertor is at least 100 times greater than the diameter $D_0$ of the discharge orifice of said nozzle.

The distance $b$ is defined approximately in the case of a pure noncondensed gas by the value of the ratio:

$$\frac{b}{D_0} = k \cdot \left(\frac{1}{kn_0} \cdot \frac{P_0}{P_1}\right)^{1/3}$$

wherein $kn_0$ designates the Knudsen number of the gas at the pressure $P_0$ prior to expansion of said gas within said chamber and $k$ designates a constant of the order of 0.125 in the case of a gas having a ratio between specific heat values at constant pressure and constant volume which is equal to 1.4, said constant being intended to increase with said ratio.

Referring now to the accompanying drawings, two examples of application of the invention will be described hereinafter and are given without any limitation whatsoever. The practical arrangements which will be described in connection with these examples must be considered as forming part of the invention although it will be understood that any equivalent arrangement could equally well be employed without departing from the scope of this invention.

FIG. 1 of the drawings shows an apparatus for producing molecular jets in accordance with the invention. The apparatus has been so designed that the molecular jet can be employed as close to the source as possible, that is to say in the range of the highest densities taking into account the divergence of the jet.

Figure 2:
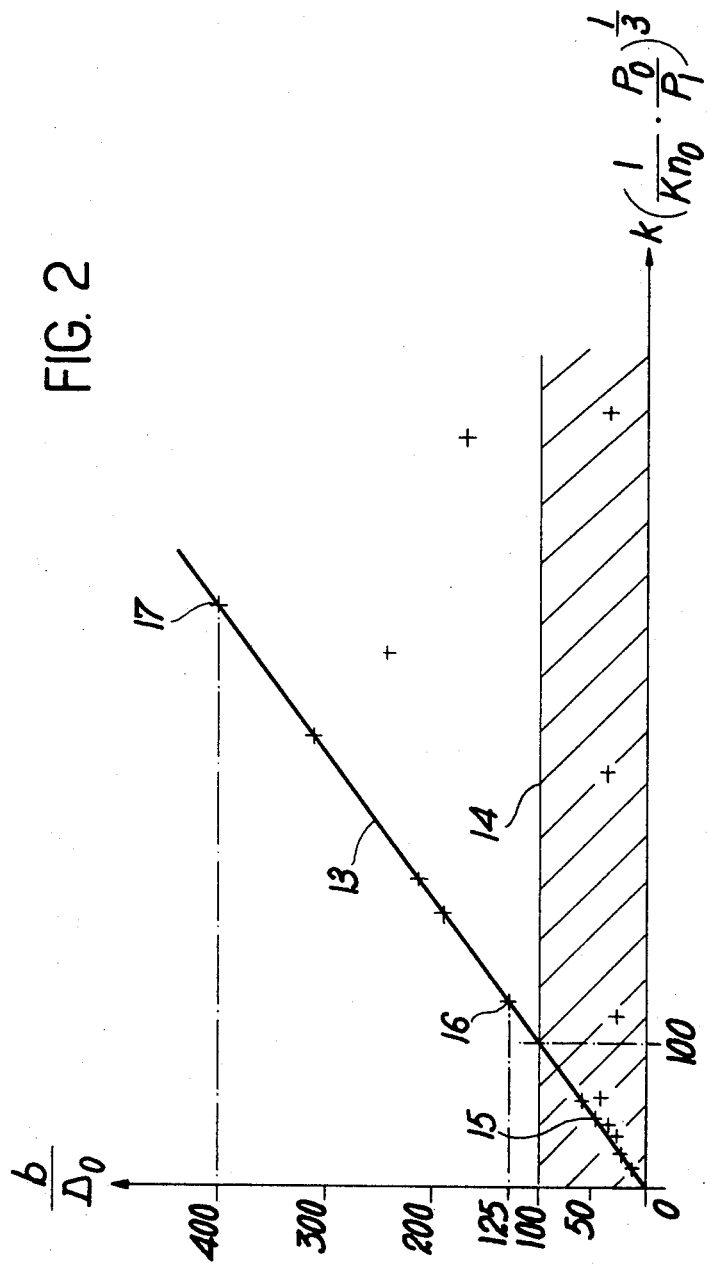

FIG. 2 is a graph which clearly shows the range contemplated by this invention.

The reservoir 1 which is shown in FIG. 1 contains a gas under a pressure $P_0$, said gas being supplied through a valve 2 and fed to a convergent nozzle 3, the mouth or discharge orifice of which is circular and has a diameter $D_0$.

The expansion chamber 4 into which said nozzle opens communicates with an intermediate chamber 5 by means of a frustoconical divergent nozzle or so-called divertor 6 which has a suitable geometry and a sharp edge and which is placed coaxially with the nozzle, the distance between the discharge orifice of said nozzle and the admission orifice of the divertor being equal to $b$. Similarly, by means of a second divergent nozzle or frustoconical divertor 8 which is coaxial with the first divertor, the intermediate chamber 5 is permitted to communicate with a third chamber 7 which utilizes the molecular jet and in which the desired molecular jet is produced. Pumps 9, 10 and 11 develop pressures $P_1$, $P_2$ and $P_3$ respectively within the three chambers 4, 5 and 7. Means 12 serve to vary the distance $b$ in order to adjust the ratio $b/D_0$ to its optimum value as given by relation (1). For more clarity in the drawings, the discharge orifice $D_0$ has been increased in size in comparison with the distance $b$ and is not shown as 100 times smaller than the distance $b$. The angles at the vertices or summits of the cones which form the divertor and the collimator are smaller than those usually adopted. In the case of the divertor, the internal angle is thus 30° and the external angle is 40°.

The angle at the summit of the cone which constitutes the collimator is smaller than the angle at the summit of the divertor.

The outer cone has a very substantial length of 20 mm., thereby permitting full utilization of the available pump speed within the first chamber.

In the graph of FIG. 2, the dimensionless quantity $b/D_0$ has been plotted as ordinates and the other dimensionless quantity has been plotted as abscissae, namely:

$$k\left(\frac{1}{kn_0} \cdot \frac{P_0}{P_1}\right)^{1/3}.$$

The straight line 13 which bisects the Y-axes represents the relation (1) given above.

The horizontal straight line 14 which corresponds to the equation $b/D_0=100$ represents the lower limit of the range contemplated by the invention The points 15 correspond to known experiments prior to the invention wherein the optimum ratio $b/D_0$ was lower than 60:1.

In the two practical examples which now follow, the installation which is shown diagrammatically in FIG. 1 is utilized at ordinary temperature.

EXAMPLE 1

The gas employed is pure nitrogen, the pressure $P_1$ is of the order of $10^{11}$ torr, the diameter $D_0$ is equal to 0.05 mm. and the pressure $P_0$ is equal to $10^4$ torr (which gives a product $P_0 D_0$ of 500 in accordance with the aforesaid condition of noncondensation).

In this example 1, the pressures $P_2$ and $P_3$ are respectively of the order of $5\times10^{14}$ and of the order of $10^{16}$ to $10^{15}$ torr, the diameters of the divertors 6 and 8 are respectively 0.5 and 1 mm. and the deliveries of the pumps 10 and 11 are respectively of the order of 100 and 1,000 l/s.

It is accordingly shown by calculation that:

the optimum value of the ratio $b/D_0$ as deduced from relation (1) is approximately 125:1;

the theoretical Mach number at the entrance of the divertor 6 is of the order of 25, this value being of the order of 2 to 3 times higher than those obtained up to the present time, which corresponds to multiplying the intensity by a factor of approximately 4 to 9;

and the pump delivery corresponding to maintenance of the pressure $P_1$ within the expansion chamber 4 is only approximately 35 to 40 l/s.

The point which represents this example 1 in FIG. 2 is designated by the reference 16.

EXAMPLE 2

The gas employed is pure helium, the pressures $P_1$, $P_2$ and $P_3$ and the diameters of the admission orifices of the divertors 6 and 8 are the same as in example 1; the diameter $D_0$ is equal to 0.10 mm. and the pressure $P_0$ is equal to $5\times10^4$ torr.

Under these conditions:

the optimum value of the ratio $b/D_0$ as deduced from the relation (1) is approximately 400:1;

the theoretical Mach number at the inlet of the divertor is of the order of 180, that is to say 10 to 20 times higher than the Mach number obtained heretofore; this corresponds to a jet 100 to 400 times higher in intensity;

the pump delivery which is necessary in order to maintain the pressure $P_1$ within the expansion chamber 4 is of the order of 2,000 l/s which is very easily obtainable by means of pumps (of the Roots type, for example) which are commercially available at the present time.

It should be noted that the pump delivery in the chamber 5 is not substantially modified with respect to the delivery which corresponds to example 1 Thus, a diffusion pump 10 which delivers a few hundred l/s is sufficient for this purpose.

In fact, in the case of a high value of intensity of the molecular jet formed within the chamber 7, the volume of the gas which flows through the divertor 8 represents a relatively substantial proportion of the volume which has passed through the divertor 6 and only the remaining portion of the volume last-mentioned remains to be pumped by the pump 10.

The pump 11 is a diffusion pump which delivers at a rate of the order of 50,000 l/s.

The point which represents this example 2 in FIG. 2 is designated by the reference numeral 17.

I claim:

1. A device for the production of jets of particles comprising a chamber, means for feeding a gas at a pressure $P_0$ into a convergent nozzle having a discharge orifice which opens into said chamber, means for maintaining said chamber at a pressure $P_1$ below $P_0$, a divertor having a divergent discharge opening in the centerline of said nozzle, the distance $b$ between the orifice of said nozzle and the inlet of said divertor being at least 100 times greater than the diameter $D_0$ of said discharge orifice of said nozzle.

2. A device in accordance with claim 1, wherein the angle at the summit of said nozzle is smaller than the angle at the summit of the divertor.

3. A device in accordance with claim 1, wherein said divertor is conical and the angle at the internal summit of said divertor is equal to 50° at a maximum.

4. A device in accordance with claim 1, wherein said divertor is conical and the difference between the angles at the external and internal summits of said divertor is equal to 10° at a maximum.

5. A device in accordance with claim 1, wherein said pressure $P_0$ is higher than $10^4$ torr.

6. A device in accordance with claim 1, wherein the gas employed is a relatively heavy gas diluted in a light gas in a proportion of a few units percent.

7. A device in accordance with claim 6, wherein at least the major part of the gas is helium.

8. A device as described in claim 1, for the production of jets of a noncondensed gas having a ratio between specific heat values at constant pressure and constant volume substantially equal to 1.4, the distance $b$, the diameter $D_0$, the pressures $P_0$ and $P_1$ and the Knudsen number $kn_0$ of the gas at the pressure $P_0$ prior to the expansion of said gas within said chamber being defined by the relation:

$$b/D_0 = 0(1 kn_0 \cdot P_0/P_1)^{1/3}$$

9. A device as described in claim 1, including a second chamber, said first divertor opening into said second chamber, a second divertor in said chamber, said second divertor having a divergent discharge opening located on the centerline of said nozzle.

10. A device in accordance with claim 9, wherein said second divertor is conical and the difference between the angles at the external and internal summits of said second divertor is equal to 10° at a maximum.